(12) United States Patent
Hiramatsu

(10) Patent No.: US 7,099,589 B1
(45) Date of Patent: Aug. 29, 2006

(54) SPACE-DIVISION MULTIPLEX FULL-DUPLEX LOCAL AREA NETWORK

(75) Inventor: Takuma Hiramatsu, Nara-ken (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/674,068

(22) PCT Filed: Apr. 22, 1999

(86) PCT No.: PCT/JP99/02157

§ 371 (c)(1),
(2), (4) Date: Apr. 6, 2001

(87) PCT Pub. No.: WO99/56416

PCT Pub. Date: Apr. 11, 1999

(30) Foreign Application Priority Data

Apr. 24, 1998 (JP) .................................. 10-114446

(51) Int. Cl.
*H04B 10/00* (2006.01)
(52) U.S. Cl. ....................... 398/127; 398/130
(58) Field of Classification Search .................... 398/1, 398/57, 79, 141, 162, 55, 118–131, 135–139
See application file for complete search history.

(56) References Cited

U.S. PATENT DOCUMENTS

| | | | | | |
|---|---|---|---|---|---|
| 4,536,057 | A | * | 8/1985 | Sumi et al. .................. | 359/892 |
| 4,727,600 | A | * | 2/1988 | Avakian ...................... | 398/126 |
| 4,975,926 | A | * | 12/1990 | Knapp ........................ | 375/141 |
| 5,532,858 | A | * | 7/1996 | Hirohashi et al. ............. | 398/57 |
| 5,726,786 | A | * | 3/1998 | Heflinger .................... | 398/128 |
| 5,822,099 | A | * | 10/1998 | Takamatsu .................. | 398/162 |
| 5,903,373 | A | * | 5/1999 | Welch et al. ................ | 398/128 |
| 5,946,118 | A | * | 8/1999 | Flaherty ..................... | 398/79 |
| 5,986,785 | A | * | 11/1999 | Kobayashi .................. | 398/131 |
| 5,986,790 | A | * | 11/1999 | Ota et al. .................... | 398/1 |
| 6,577,426 | B1 | * | 6/2003 | Jebens ........................ | 398/126 |

FOREIGN PATENT DOCUMENTS

| | | |
|---|---|---|
| JP | 3-109837 | 5/1991 |
| JP | 6-112903 | 4/1994 |
| JP | 9-252143 | 9/1997 |
| JP | 9-261176 | 10/1997 |
| JP | 9-307502 | 11/1997 |

OTHER PUBLICATIONS

T.S. Chu, et al.; "High Speed Infrared Local Wireless Communication"; IEEE Communications Magazine; 1987; vol. 25; No. 8;pp. 4-10.

J.M. Kahn, et al.; "Wireless Infrared Communications"; Proceedings of the IEEE; 1997; vol. 85; No. 2; pp. 265-298.

D.R. Wisely; "A 1Gbit/ s Optical Wireless Tracked Architecture for ATM Delivery"; IEE Colloquium On Optical Free Space Communication Links; London, UK; IEE; 1996; pp. 14 / 1-7.

(Continued)

*Primary Examiner*—Agustin Bello
(74) *Attorney, Agent, or Firm*—David G. Conlin; David A. Tucker; Edwards Angell Palmer & Dodge LLP

(57) ABSTRACT

An optical wireless local area network according to the present invention is an optical wireless local area network for interconnecting a plurality of terminals having a line-of-sight optical communication function. In the optical wireless local area network, a base station including an angle diversity light reception function and a plurality of optical transmitters each having directionality is provided. The intensity of each of the plurality of optical transmitters can be separately modulated.

10 Claims, 8 Drawing Sheets

OTHER PUBLICATIONS

D.R. Wisely; et al.; "A 100Mbit/s Tracked Optical Wireless Telepoint"; Proceedings of 8th International Symposium on Personal, Indoor and Mobile Radion Communications (PIMRC '97, Helsinki, Finland, Sep. 1-4, 1997; New York, NY, USA; IEEE, 1997; pp. 964-968, vol. 3.

K. Iversen, et al. "*Application of Algorithms for DOA Estimation and Beamforming to Infrared Photodiode Arrays*", Acoustics, Speech and Signal Processing, 1997, 1997 IEEE International Conference on Munich, Germany, Apr. 21-24, 1997, Los Alamitos, CA USA, IEEE Comput. Soc, US, vol. 5, Apr. 21, 1997 pp. 4053-4056.

A. P. Tang, et al., "*Wireless Infrared Communication Links Using Multi-Beam Transmitters and Imaging Receivers*", 1996 IEEE International Conference on Communications, Converging Technologies for Tommorrow's Applications, Dallas, Jun. 23-27, 1996, IEEE International Conference on Communication, New York, IEEE, US, vol. 1, Jun. 23, 1996, pp. 180-186.

D. P. Johnson, et al., "*Free-Space Infrared Local Area Network (FIRLAN)*", Optical Engineering, Soc. of Photo-Optical Instrumentation Engineers, Bellingham, US, vol. 32, No. 9, Sep. 1, 1993, pp. 2114-2117.

\* cited by examiner

FIG. 8   PRIOR ART
(a)
(b)
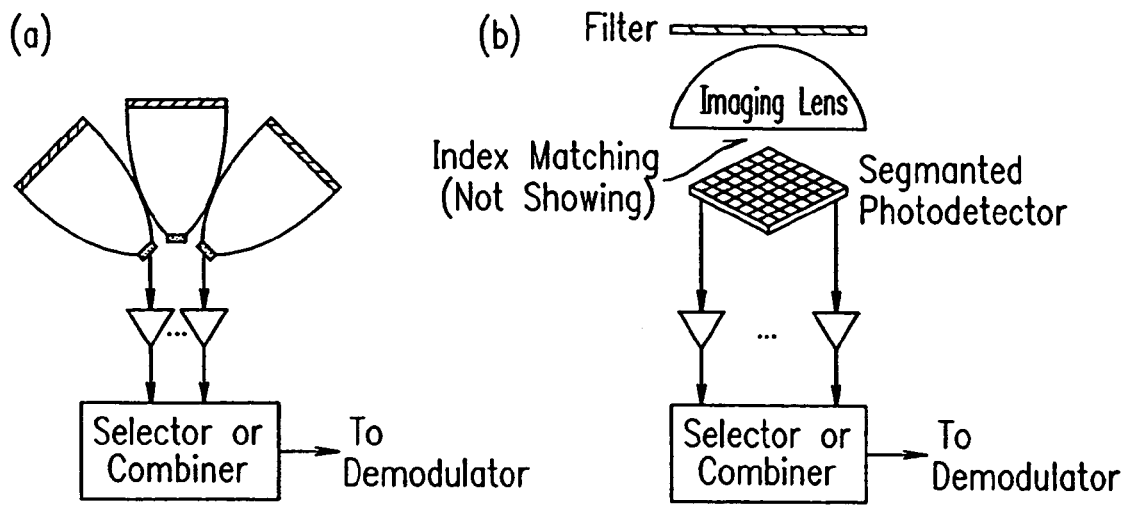
(c)
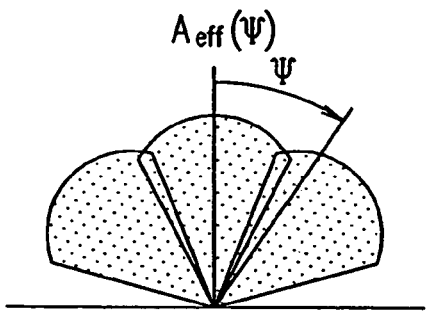
(d)
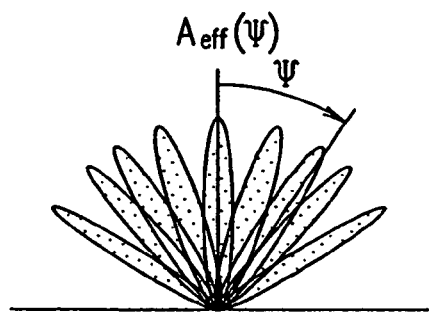

SPACE-DIVISION MULTIPLEX FULL-DUPLEX LOCAL AREA NETWORK

TECHNICAL FIELD

The present invention relates to a space-division full-duplex local area network for interconnecting information terminals having a directed/line-of-sight optical communication function for use in an office or home environment.

BACKGROUND ART

At present, optical wireless communication, which uses infrared ray in data transmission between information terminals in offices or homes, in conformity with the Infrared Data Association (IrDA) standard is widespread. In such optical wireless communication, an optical transmitter-receiver includes a light emitting diode (LED) having a certain directionality as a transmitter and a photodiode (PD) having an appropriate field of view as a receiver.

Two terminals each including such an optical transmitter-receiver are placed a short distance from one another, facing each other. The terminals perform line-of-sight communication by intensity modulation with direct detection (IM/DD). Such directed/line-of-eight optical communication is most advantageous to a portable terminal which requires low power consumption, small size, low weight, and low cost, and therefore is widely used. To date, the communication rate of the directed/line-of-sight optical communication is 4 Mbps, and the transmission range thereof is 1 m. In the future, directed/line-of-sight optical communication will be developed to achieve a communication rate of 100 Mbps and a transmission range of 5 m. Directed/line-of-sight optical communication is increasingly widespread among end users through more and more various applications handling moving pictures and the like.

A LAN (local area network) in which communication is performed by IM/DD using infrared light as a medium has been vigorously developed throughout the world.

FIG. 7 shows various forms of Infrared communication, and corresponds to FIG. 1 in Publication 1 (Joseph M. Kahn et al., Proceedings of the IEEE, pp. 265–298, 1997). FIG. 7 is divided into upper and lower rows (line-of-sight and non-line-of-eight, respectively) depending on whether or not line-of-sight communication is used. FIG. 7 is also divided into columns (directed, hybrid, and non-directed) depending on whether a transmitter-receiver has directionality. In an optical wireless LAN in which a plurality of terminals are wirelessly connected to each access point, light needs to be avoided from being blocked by a barrier or people walking in a network space, for example. Therefore, as shown in the lower right corner of FIG. 7, light is diffused and transmitted in a wide field range, and the light is received by a receiver having a wide field of view. Communication in the form of a non-directed/non-line-of-sight diffuse link is promising. Alternatively, a hybrid system shown in the middle of FIG. 7 is used in which a transmitter uses a directional beam and a receiver has a wide field of view. These systems have merit in the construction of flexible LANs, but require high-cost transmitter-receivers having a high level of power-consumption, or multi-stage transponders. These systems find acceptance in heavily used indoor environments such as offices, hospitals, or schools.

Such existing LAN systems employ their own communication forms and communication protocols which are not compatible with the IrDA standards which are widely used for portable terminals and the like. Even though IrDA terminal users desire to interconnect a plurality of terminals, their IrDA communication functions cannot be used. A whole system must be newly introduced. Recently, Kahn et al. proposed in Publication 1 that a simultaneous link is achieved using space division multiplexing among a plurality of terminals having a directed/line-of-sight communication form shown in the upper left corner of FIG. 7. In this proposal, data transmission among all of the terminals is mediated by an angle-diversity receiver and multi-beam transmitter, which together constitute a so-called optical wireless hub.

FIG. 8 shows two examples of an angle-diversity receiver which is a major component of an optical wireless hub, and corresponds to FIG. 22 of Publication 1. In either example shown in FIG. 8, any angle at which signal light comes from corresponds to the coordinate of the position of one of a plurality of photodetectors.

Of the examples shown in FIG. 8, an example in which an imaging lens having a relatively high spatial resolution is used will be particularly described, with reference to FIG. 8(b), which is a diagram showing a configuration of an imaging receiver and FIG. 8(d), which is a diagram schematically showing the spatial resolution of the imaging receiver of FIG. 8(b). In this case, the imaging lens is designed so that an optical signal from any direction is converged to a signal focusing plane. Therefore, an optical signal incident to the imaging lens at a certain angle is detected by a certain cell (and/or cells in the vicinity of the cell) of a monolithic photodetector array which outputs a signal in response to the incident optical signal. The detected signal is amplified by a preamplifier array subsequent to each cell. Of such detected signals, a signal having the highest intensity is selectively processed so that signal sources having different angles with respect to the imaging receiver can be separately identified. In principle, an N-to-N simultaneous communication is possible.

However, there are various problems to be overcome in order that the portable terminals are directly incorporated into a high-speed LAN having a random multiple access capability. One of the problems is that transmission and reception cannot be simultaneously conducted in the communication between the portable terminals in conformity with the IrDA standard, limiting the communication to a half-duplex communication. The major physical factor of such a problem is that transceivers must be simple, small, and inexpensive and therefore the transceivers cannot have a structure for preventing transmitted light from diffracting and returning to the transceivers that have transmitted the light (e.g., a receiver and a transmitter are positioned at a sufficient distance from each other).

Further, in conventional optical wireless LANs, optical transmission and reception may be conducted using a signal optical channel (e.g., diffuse light in a single wavelength band covers an entire network area). Such communication is limited to one-way 1-to-N (broadcast) communication. Time division multiplexing (TDM) is introduced to the communication, thereby making it possible to conduct time division multiplex access (TDMA). When a system interconnects a plurality of terminals, it is difficult to significantly increase a transmission rate between each terminal and the power consumption of the whole system is increased. The system may interconnect a plurality of terminals using a so-called cellular communication system in which a network space is divided into space cells using a plurality of beams having a certain level of directionality. In this case, when TDMA is conducted in half-duplex communication, it must be verified that other terminals have already conducted a communication, just before each terminal starts communicating on the LAN. Such a verification procedure is called collision avoidance. Even when the collision avoidance procedure is conducted, if a terminal in a bad communication state (hidden terminal) exists within an area, a communication error may occur.

Even when a code is assigned to each communication channel (CDMA) or a carrier frequency is assigned to each communication channel (FDMA), i.e., multiplexing using an electric circuit, a communication capacity per user is limited. In this case, signal processing is very complex, and the power consumption of the whole system is inevitably increased. Even when CDMA or FDMA is combined with the cellular communication system in the LAN, simultaneous communication among a plurality of terminals causes interference among the signals. Therefore, the conventionally well-known collision detection procedure is indispensable. Therefore, a waiting time and an extra signal processing are required for each terminal, so that it is difficult to provide a satisfactory high-speed LAN environment.

However, in wavelength division multiple access (WDMA) in which a communication wavelength is assigned to each channel, multiple access can, in principle, be simultaneously conducted in a diffuse link. In this case, the wavelength of a light source of each transmitter needs to be variable. Conversely, when a light source of each transmitter has a constant wavelength and a plurality of wavelength bands are used, a receiver requires a bandpass filter in which only single wavelengths are selected from all of the wavelength bands used in a link and a center wavelength of transmission is variable. Such functions are not easily achieved in a single device at low cost. Accordingly, a transmitter including a plurality of light sources each having a constant wavelength and a receiver including a plurality of filters each having constant bandpass characteristics are required for each terminal, so that a practical system is not achieved.

The object of the present invention is to provide a high-speed and large-capacity LAN in which a plurality of terminals can be simultaneously interconnected without producing significant load on the terminals and in which improved communication abilities (longer distance or higher speed) of the terminals are directly achieved, using the merits of the directed/line-of-sight optical communication which is widespread for use in portable terminals.

DISCLOSURE OF THE INVENTION

According to the present invention, in a transmitter-receiver unit of each terminal, a receiver includes an optical filter for cutting signal light from its own transmitter. Space-division communication among all of the terminals is conducted using an optical wireless hub having a space division capability. The wavelength band of each light source of a multi-beam transmitter of the optical wireless hub contains a spectrum component different from the spectrum components of all of the wavelength bands used by each terminal. Thereby, a simultaneous and full-duplex multi-access LAN among a plurality of terminals performing directed/line-of-sight communication is achieved. Also, the speed of one-to-one directed communication between terminals is increased as much as possible.

According to one aspect of the invention, an optical wireless local area network for interconnecting a plurality of terminals having a line-of-sight optical communication function is provided, in which a base station including a light receiving function of an angle-diversity type and a plurality of optical transmitters having directionality is provided and the plurality of optical transmitters can separately perform intensity modulation. Thereby, the above-described object is achieve.

A terminal alone may be accommodated in each space cell corresponding to each of the plurality of optical transmitters.

A far-field pattern of a light source of the optical transmitter may be satisfactorily approximated by a generalized lambertian; a half intensity-angle $\phi$ of the light source of each of the plurality of optical transmitters with respect to an angle $\theta$ of each space cell may be given by $\phi=C\times\theta$ (C is constant) Where C is in a range from 0.70 to 1.00.

The bass station may detect a communication request optical signal transmitted from a terminal to be communicated with the base station, and may notify the terminal of intensity data of the optical signal or data of an optical signal/noise ratio.

The terminal may have a function of manually adjusting a direction of an optical transmitter-receiver at a terminal side while recognizing the intensity data of the optical signal or the data of the optical signal/noise ratio transmitted from the base station.

Each terminal may include a transmitter having one or a plurality of semiconductor lasers or light emitting diodes having the same wavelength band as that of light sources, and a photodetector having an optical filter for selectively attenuating light transmitted from the transmitter of the terminal.

A wavelength band of the light source of the transmitter of each terminal may vary among the terminals or applications.

A wavelength band of the light sources of the transmitters of the base station may have a spectrum component different from that of the light source of each terminal.

The optical wireless local area network may include means for easily removing the optical filter.

According to another aspect of the present invention, an optical wireless communication system for use in an optical wireless local area network for interconnecting a plurality of terminals having a line-of-sight optical communication function is provided, in which communication is started by a procedure including: (a) a base station including a light receiving function of an angle-diversity type detecting a communication request optical signal transmitted from each terminal; (b) the base station comparing among a signal from each photodetector receiving the communication request optical signal, and selecting a photodetector having a highest optical signal intensity or a highest optical signal/noise intensity ratio, or calculating a highest optical signal/noise intensity ratio based on signals of a plurality of photodetectors, and recognizing space cells located in each terminals; (c) the terminal being notified of intensity data of the optical signal or data of an optical signal/noise ratio of the communication request signal from an optical transmitter forming an optical space cell corresponding to each terminal; (d) a direction of the optical transmitter-receiver of the terminal being manually adjusted while recognizing the intensity data of the optical signal or the data of the optical signal/noise ratio; and (e) a signal providing communication permission being transmitted from the base station to the terminal when the intensity data of the optical signal or the data of the optical signal/noise ratio of the communication request optical signal reaches a value allowing communication. Thereby, the above-described object is achieved.

BRIEF DESCRIPTION OF THE DRAWINGS

FIG. 8 is a diagram used for explaining an angle-diversity receiver.

BEST MODE FOR CARRYING OUT THE INVENTION

The present invention is based on IM/DD. In examples of the present invention described below, communication protocols or modulation/demodulation systems are not described in detail. A detailed description is given of the operation of an entire LAN system. The object of the present invention or the present invention itself is effective in any protocol or modulation/demodulation system. In other words, effects of the present invention can be obtained without depending on any protocol or modulation/demodulation system.

EXAMPLE 1

Figure 1:
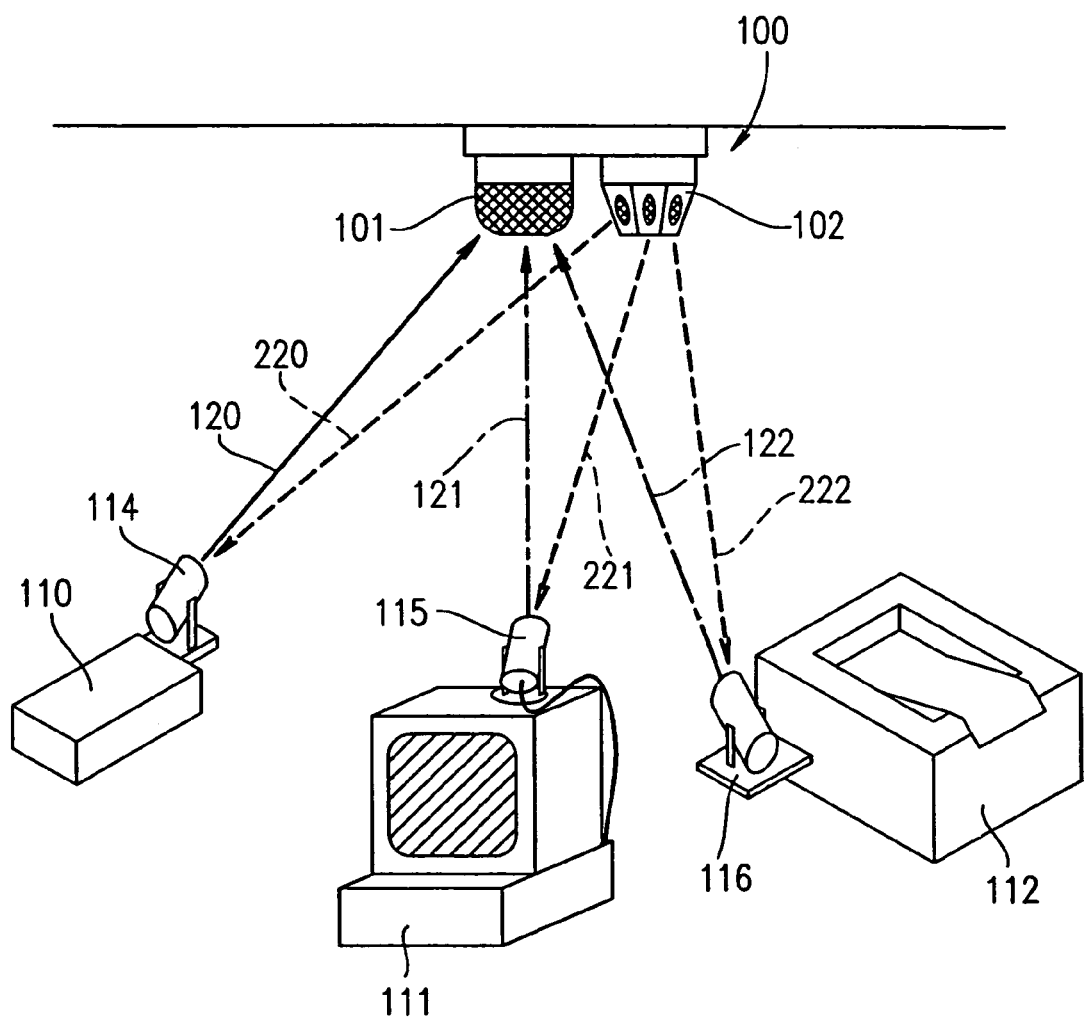
FIG. 1 is a schematic diagram showing a local area network according to the present invention.

FIG. 1 shows an entire LAN system according to Example 1 of the present invention. The LAN system of Example 1 includes an optical wireless hub 100 provided on a ceiling, a portable terminal 110, and a computer 111 such as a desktop computer, and a printer 112. In Example 1, a card-type transmitter-receiver unit 114 is attached to the portable terminal 110. A card-type transmitter-receiver unit 116 is attached to the printer 112. A port connection-type transmitter-receiver 115 is attached to the computer 111. The card-type transmitter-receivers 114 and 116 and the port connection-type transmitter-receiver 115 each have an axis whose direction can be freely changed. Structures of the transmitter-receivers 114 through 116 will be described later with reference to FIGS. 6A and 6B. The optical wireless hub 100 includes an imaging receiver 101 as a receiver. In FIG. 1, the transmitter-receivers 114 through 116 transmit beams toward the imaging receiver 101. The beams are respectively indicated by reference numerals 120, 121, and 122.

Figure 2:
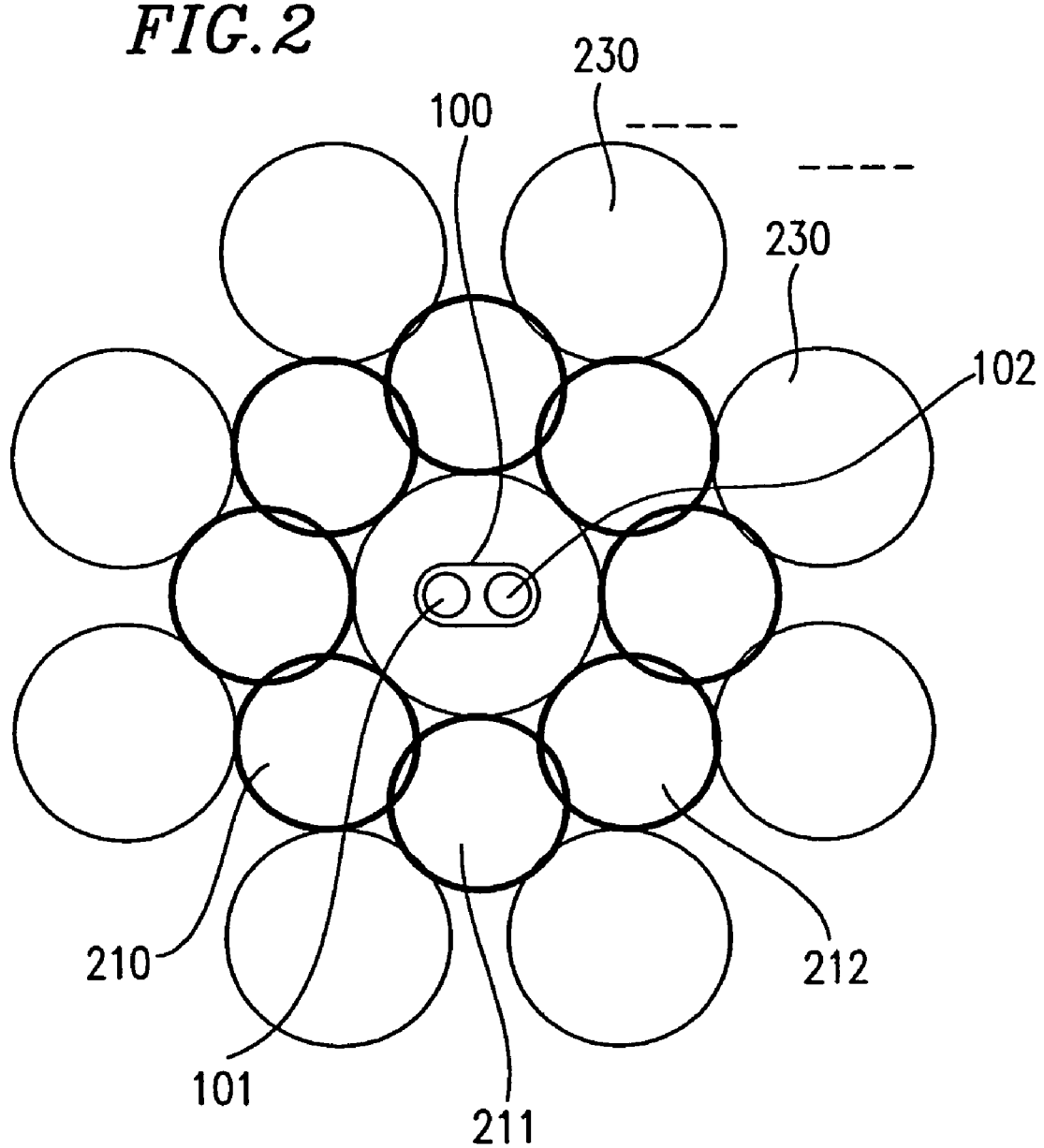
FIG. 2 is a top view showing a configuration of space cells produced by a multi-beam transmitter according to the present invention.

FIG. 2 shows space cells formed by the respective beams of a multi-beam transmitter 102 which is a transmitter of the optical wireless hub 100, the space cells being viewed from directly above. The size of each cell is determined by the directional angle of each beam of the multi-beam transmitter 102 and the height of the ceiling. In FIG. 2, the space cells corresponding to the respective terminals 110, 111, and 112 are indicated by reference numerals 210, 211, and 312. The diameter of each of the space cells 210, 211, and 212 is about 1 m. In FIG. 1, the beams forming the space cells 210, 211, and 212 are indicated by reference numerals 220, 221, and 222, respectively.

Hereinafter, the optical wireless hub 100 and the space division multiplexing will be described. The imaging receiver 101 which is the receiver of the optical wireless hub 100 includes at least; an imaging lens including a plurality of lenses combined with each other as described with respect to the conventional techniques; an array provided on the focal plane of the imaging lens, in which a silicon pin PD is integrated with a monolithic, a low noise preamplifier array connected to each cell in the array; and a multiplexer for conducting signal processing such as calculating a signal/noise ratio (SNR) for an individual signal of each cell and comparing SNRs among each cell, and for determining a cell which will be used for signal reception from a certain terminal. Further, the multi-beam transmitter 102 requires a driver dedicated to the light source of each beam so that individual signals can be simultaneously transmitted to all of the space cells. The optical wireless hub 100 requires a driver circuit interconnected with both the imaging receiver 101 and the multi-beam transmitter 102. The driver circuit requires a multiplexer for providing instructions such as establishment or mediation, link management, and timing control of communication among a plurality of terminals while taking into account temporary storage of data, instruction requests, and the like.

The spatial (angle) resolution of the imaging receiver 101 is preferably higher than spatial resolution determined by the sizes of the space cells 210 through 212, i.e., the beams 220 through 222 of the multi-beam transmitter 102. As described with respect to the conventional techniques, a certain cell in the PD array, which is determined by an angle which the imaging receiver 101 and incident signal light attain, and the above-described space cell formed by a beam emitted from the multi-beam transmitter 102 in a direction substantially equal to the direction of the incident signal light must have a one-to-one correspondence in advance. The above-described correspondence should be determined as an inherent property of the optical wireless hub 100 in advance.

In Example 1, the size (a thick solid line) of each space cell is determined based on the beam directional angle of the multi-beam transmitter 102, the height of the ceiling, the position of the space cell, and the minimum reception sensitivity of the terminal receiver. The imaging receiver 101 of the optical wireless hub 100 typically has a higher spatial resolution. When the size of a space cell is sufficient to accommodate only one terminal, an existing IrDA terminal can be incorporated into a local area network which guarantees a high level of throughput at low cost and low power consumption without requiring another electric multiplexing technique. In this case, the effects of the present invention can be maximally obtained. The size of an overlapped region is appropriately determined based on the calculated or measured bit error rate, even though depending on the size of a dead zone tolerable for the network. As for the spatial positions of the multiple beams, the multiple beams may be a plurality of concentric circles, or alternatively, the multiple beams may be provided directly under the transmitter 102 (a thin solid line).

A preferred example of a light source having a generalized lambertian far-field pattern used as a light source of the multi-beam transmitter will be described below. More preferably, an angle of a space cell is given by θ=arctan(R/D), where R is the radius of a space cell accommodating only one terminal, and D is the distance from the multi-beam transmitter to a point at which the radiant intensity of the multi-beam transmitter reaches a peak in a space cell. D is changed depending on a maximum possible range for communication which is designated by a user utilizing the present invention. The radius R is evaluated on a plane which includes a terminal and is normal to a line connected between the multi-beam transmitter and the point at which the radiant intensity of the multi-beam transmitter reaches a peak in a space cell. The radius R is appropriately selected in a range which is regarded as an optimal range by a user utilizing the present invention.

In this case, it is difficult to optimize the cell positions and the settings of the light output of the transmitter in order to obtain as large a coverage area as possible while taking into account interference between the overlapping adjacent space cells. Theoretical and experimental studies which the inventors of the present invention have conducted have demonstrated that a light output required for a multi-beam transmitter is minimized in a communication distance which is typically used in a network environment of a typical small office space or a home space under a more general condition of $\phi$ given by $\phi = C \times \theta$ (C is constant), where $\phi$ is the half-angle of a light source of a multi-beam transmitter forming each space cell and C is selected in the range from 0.70 to 1.00.

Specifically, communication was simultaneously conducted among a plurality of channels where the transmission distance D=100 to 500 cm and correspondingly the cell radius R=20 to 100 cm. Meanwhile, the bit error rates of a down link with respect to various half-angles $\phi$ were evaluated and studied. As a result, the constant C that achieved a large coverage area while minimizing power consumption was in the range from about 0.80 to about 0.90. It was found that a preferable half-angle of the light source of the multi-beam transmitter was obtained when C was in such a range.

Note that the above-described result was obtained when the radius R is defined in the plane that includes a terminal and is normal to a line connected between a multi-beam transmitter and the point at which the radiant intensity of the multi-beam transmitter reaches a peak in a space cell. When the multi-beam transmitter is provided on a ceiling as in Example 1, a space cell on the peripheral portion of the plane on which the terminal exists is enlarged by an angle from the multi-beam transmitter. In this case, to obtain an optimal state, a relatively small $\phi$ is assigned to the peripheral portion, while a relatively large $\phi$ is assigned to space cells directly under the multi-beam transmitter. For communication distances in a network environment of a typical small office space or a home space including all of the above-described cases, if C is designated in the range from 0.70 to 1.00, a down link system is simply constructed by designating the geometry of radiant intensity peak positions of space cells. Such a simple design is effective in practical use.

Next, a spectrum characteristic of a transmitter-receiver of a terminal will be described. The light sources of the beams 120 through 122 from transmitters of the terminals 110 through 112 shown in FIG. 1 are Fabry-Perot laser diodes (LDs) of AlGaAs having a wavelength band from 780 to 850 nm. The receivers of the terminals 110 through 112 are silicon pin photodiodes (PDs).

Figure 5:
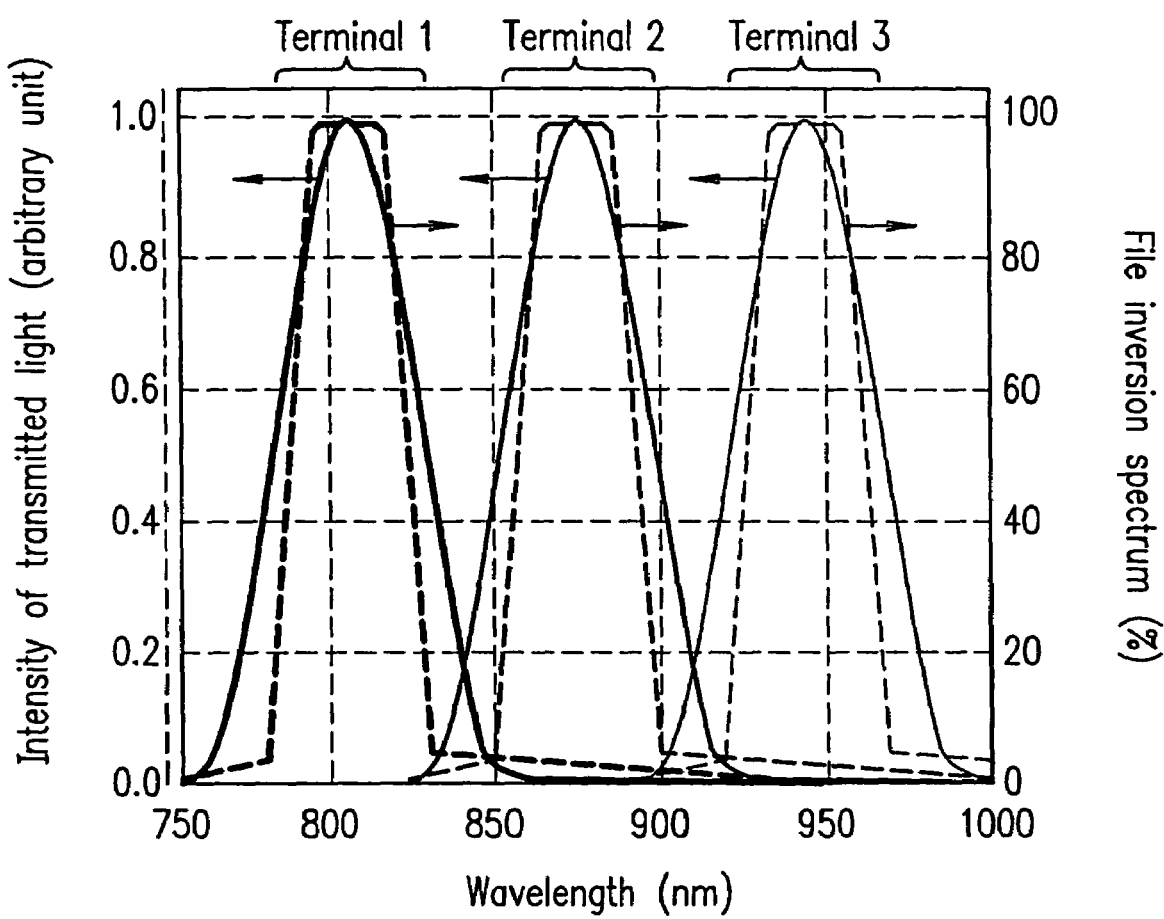
FIG. 5 is a diagram showing spectrum characteristics of a transmitter-receiver unit of a terminal according to Example 2 of the present invention.

Band-cut filters are provided around the PDs to prevent light emitted from the LDs from being diffracted and returned to the PDs in the same terminals (see FIG. 5). The band-out filters have reflectance which is selectively high with respect to the wavelength of the light emitted from the LDs.

Figure 3:
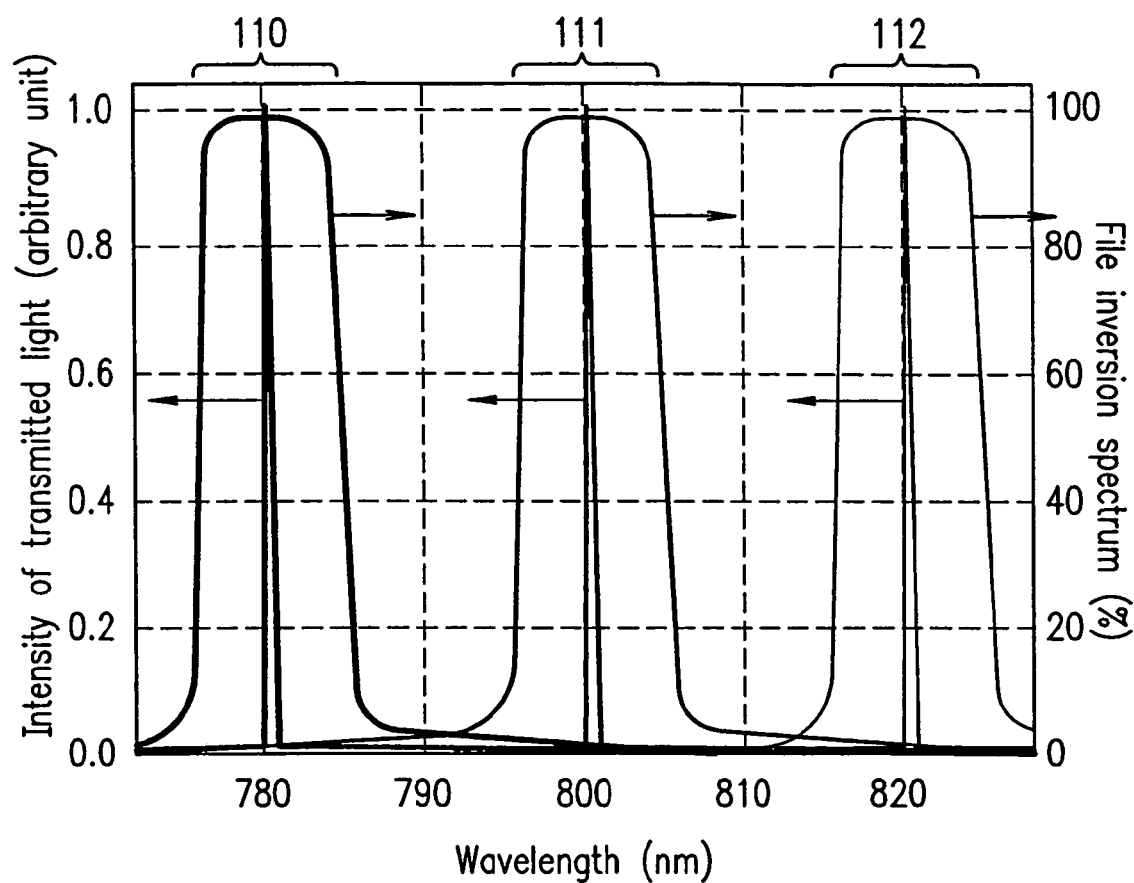
FIG. 3 is a diagram showing spectrum characteristics of a transmitter-receiver unit of a terminal according to Example 1 of the present invention.

FIG. 3 shows light intensity spectra of the transmitters and reflection spectra of the band-cut filter included in the receivers, of the transmitter-receivers 114 through 116 of the respective terminals 110 through 112. Specifically, the wavelength of the LD in the transmitter of the transmitter-receiver unit 114 included in the portable terminal 110 is 780 nm. The center wavelength of the band-cut filter in the receiver thereof is also set to 780 nm. The bandwidth of light cut is about 10 nm. The band having a width of 10 nm centered at 780 nm is referred to as the wavelength band used in the portable terminal 110. Similarly, the wavelength used in the transmitter-receiver unit 115 of the computer 111 is set to 800 nm, and the wavelength used in the transmitter-receiver unit 116 of the printer 112 is set to 820 nm.

The band-cut filter can be made of a planar dielectric multi-layer film. The center wavelength, bandwidth, reflectance, and the like of the band-cut filter can be set to desired values by appropriately designating materials, the number of the materials, the thickness of each layer, repeating patterns, and the like. A problem with the planar dielectric multi-layer film is that since the optical path length is changed with the incident angle of light, the center wavelength as well as the incident angle of the light is shifted. However, in the present invention it is assumed that the transmission and recession of light together form line-of-sight communication having as high a level of directionality as used in communication among portable terminals. Therefore, the above-described influence of an angle shift can be sufficiently reduced, and the planar dielectric multi-layer film is sufficient for practical use. Needless to say, in FIG. 3, the wider the bandwidth of light cut by the band-cut filter, the less the influence of noise due to sun light, fluorescent lamps, incandescent lamps, or the like.

As described above, in each terminal, a receiver includes a filter for cutting signal light emitted from its own transmitter. Each terminal performs communication via the optical wireless hub 100 employing a transmission light source including a spectrum component of a wavelength different from that used in the terminals 110 through 112. This allows full-duplex communication. The space multiplexing allows each terminal to achieve multiple access in the LAN. Further, if the wavelengths used by the terminals are different from each other, one-to-one full-duplex communication between the terminals as well as a simultaneous link among a plurality of terminals can be achieved. Note that a wavelength used in each terminal and a relationship between the wavelength and the spectra of the beams 220 through 222 of the multi-beam transmitter 102 will be described in detail after describing the operation of the entire LAN system of Example 1.

The operation of the entire LAN system in accordance with instructions will be described. The instructions are: data is transferred from the portable terminal 110 to the computer 111, the data is added to a shared file; and the result is output via the printer 112. The communication between the terminals 110 through 112 and the optical wireless hub 100 is conducted via the directional beams shown in FIG. 1 or 2. Hereinafter, such communication is simply described as "transmission from A to B" or the like if does not need to be particularly specified.

An optical axis adjuster on which the transmitter-receiver unit 114 of the portable terminal 110 is visually and manually adjusted with respect to the optical wireless hub 100. Light sources have a directional half angle of about ±15° which allows easy axis alignment. In addition, the light sources achieve eye safety in conformity with the class I of the international standard ISC60825-1. To this end, the diameter of emitted light from the light sources is enlarged to 4.5 mm using lenses and diffuse plates. The tolerable maximum outputs of the light sources are designated to 58 mW. Such outputs have a sufficient level of power to cause a bit error rate to be 10 to the power of −8 or less in a one-to-one communication where the transmission distance is 3 m and the communication rate is 100 Mbps. In this case, it is assumed that the quantum efficiency of the silicon pin PD is 0.7, and the radius of effective received light is 7.5 mm.

When a communication request is transmitted via the beam 120 from the transmitter of the portable terminal 110 to the optical wireless hub 100, the imaging receiver 101 (receiver) of the optical wireless hub 100 receives the communication request and, as described above, can recognize that the communication request is a signal transmitted from the space cell 210 in which the portable terminal 110 is located. The optical wireless hub 100 transmits a communication acknowledgement signal via the beam 220 providing the space cell 210 in which the portable terminal 110 is located, among the beams of the multi-beam transmitter 102, in order to give a communication acknowledgement to the portable terminal 110. In this case, when the optical axis alignment of the transmitter-receiver unit 114 of the portable terminal 110 is insufficient so that the imaging receiver 101 cannot receive the above-described communication request, i.e., the beam 120, it cannot be recognized that axis alignment is achieved in the portable terminal 110 according to the fact that the portable terminal 110 has transmitted the communication request, but after being ready for a given period of time has not transmitted the above-described communication acknowledgement. Therefore, a user again performs optical axis alignment visually and manually. However, when the beam 120 transmitted from the transmitter-receiver unit 114 of the portable terminal 110 is permitted to have a directional half angle of about ±15 and the transmission distance is. 3 m, the precision of the axis alignment is about ±70 cm and a complex function, such as automatic tracking, is not required.

Next, the operation of the optical wireless hub 100 when a link is established will be described. It is assumed that optical axis alignment of the transmitter-receiver unit 114 is achieved where the imaging receiver 101 can receive a signal, but the signal/noise ratio (SNR) thereof is insufficient. The optical wireless hub 100 can transmit data, which represents increases or decreases in the intensity of light received (or SNR) by the imaging receiver 101, to the portable terminal 110 in real time using the multi-beam transmitter 102 (such a communication does not require a high bit rate). Therefore, a user of the transmitter-receiver unit 114 can adjust the optical axis of the transmitter-receiver unit 114 to obtain the optimal direction of the optical axis so that the intensity of the received light (or SNR) is maximized based on the above-described data. The optical wireless hub 100 transmits a signal representing completion of the above-described link establishment procedure to the portable terminal 110 when the optical wireless hub 100 determines that a sufficient SNR for communication is achieved.

After completion of the above-described one-to-one link establishment, the portable terminal 110 requests the optical wireless hub 100 to execute the above-described instruction. In this case, the portable terminal 110 transmits to the optical wireless hub 100 data to be added to a file in the computer 111, a request for data addition to an application file in the computer 111, a request for transmission of the data resulting from the addition, to the optical wireless hub 100, and a request that the data resulting from the addition which has been transmitted to the optical wireless hub 100 is transmitted and output from the optical wireless hub 100 to the printer 112. Such instructions are temporarily stored in a memory of the optical wireless hub 100 and thereafter executed sequentially. For the sake of simplicity, it is assumed that optical axis alignment and link establishment between the optical wireless hub 100 and each of the computer 111 and the printer 112 have been already conducted. If optical axis alignment of a fixed terminal has been once conducted using the above-described procedure, no subsequent alignment is required. A plurality of the above-described link establishments can be conducted simultaneously.

Next, the optical wireless hub 100 searches the computer 111 using the multi-beam transmitter 102. In the search, in contrast to when the above-described link is established, the multi-beam transmitter 102 transmits communication requests to all of the cells. In this case, using a procedure similar to that used when the above-described optical axis alignment is conducted, communication between each terminal (computer 111 and printer 112) and the optical wireless hub 100 is conducted so that a content held in the terminal is recognized, Specifically, a terminal having an address requested by the above-described instruction is searched. Alternatively, when an address is not assigned in advance, a terminal having a file or data requested is searched. After such a terminal has been found, the instruction is sequentially executed. Specifically, data from the portable terminal 110 is added to a corresponding application file in the computer 111. The data resulting from the addition is transmitted from the computer 111 to the optical wireless hub 100. The data resulting from the addition which has been transmitted to the optical wireless hub 100 is transmitted and output from the optical wireless hub 100 to the printer 112. All of the processes discussed so far can be simultaneously conducted in parallel in the full-duplex communication using wavelength multiplexing along with space multiplexing, which are described in detail later. Therefore, even when requesting communication, if a terminal has conducted communication in a network, it is possible to achieve a satisfactory network environment, unlike conventional optical wireless LANs in which a given waiting time is required.

In Example 1, only three terminals constitute a LAN. In the LAN, each terminal does not receive its own signal light, and conducts communication using a light source having a spectrum component different from a wavelength band. Therefore, a full-duplex multiple access LAN is obtained. When the number of terminals is increased, the one-to-one communication form between each terminal needs to be available in order to avoid the overlapping of the wavelength used in each terminal as long as each terminal has the above-described filter.

Therefore, in Example 1, all of the terminals employ LDs having different wavelengths as transmitter light sources at the terminal sides. It is assumed that the transmitter light sources are limited to AlGaAs LDs (780 nm through 850 nm). Even when an interval between each wavelength channel is 10 nm using a band-cut filter having a bandwidth (10 nm) similar to Example 2, 8 wavelength channels can be provided. In this case, the maximum number of terminals that are connected to a LAN of Example 1 and can conduct one-to-one full-duplex communication with each other is 8.

When each terminal employs an LD as a transmitter light source, a line width is well below 1 nm. An interval between each of the above-described wavelength channels is determined by a narrow bandwidth of the band-cut filter. As described above, as for the filter, the tolerable range of an angle shift from the optical axis does not need to be significantly increased. Alternatively, the filter may be combined with a condenser employing a parabolic plane or the filter may be provided on a curvature so that the band cut width is reduced to 5 nm or less and the wavelength channels are spaced at an interval of 5 nm. Therefore, 15 channels can be provided between 780 to 850 nm. When an AlGaInP red color LD (630 to 680 nm) which is presently put into practical use and an InGaAs/AlGaAs LD (980 nm) are used, 14 channels can be provided if the wavelength channels are spaced at an interval of 10 nm or 26 channels can be provided if the wavelength channels are spaced at an interval of 5 nm while an inexpensive silicon pin-PD is still used in a receiver. Alternatively, in order to achieve a longer-range and a hyper high-speed link, a combination of an LD of InP/InGAsP or GaAs/GaInNAs having a long wavelength band from about 1.2 to about 1.6 μm and a PD of Ge or InGaAs may be employed. Up to this point, the Fabry-Perot semiconductor laser has been described as an example. For any of the above-described materials, a distributed feedback laser or a distributed reflection laser may be employed. Further, when planar light emitting lasers are provided in an array, a diameter of the emitted light can be effectively increased.

Next, a relationship between a wavelength band used by a light source of the multi-beam transmitter 102 and a wavelength band used by each terminal will be described. The number of beams from the multi-beam transmitter 102 is equal to the number of cells dividing a space. The direction of each beam is fixed. An angle that the ceiling and the beam attain may be adjustable, but the angle is fixed during communication. Each beam may be emitted from a light source having a different wavelength band. Preferably, a single wavelength band is basically employed in view of the cost or the simplicity of a system. However, when a network space is occupied by cells, leaving no space, the cells overlap with one another. Further, in this case, light sources having different wavelength bands are employed for adjacent cells. This configuration is conventionally well known and is called wavelength multiplex communication. The size and overlap of each cell can be appropriately designated in view of a tolerable bit error rate for communication in a LAN.

Figure 4:
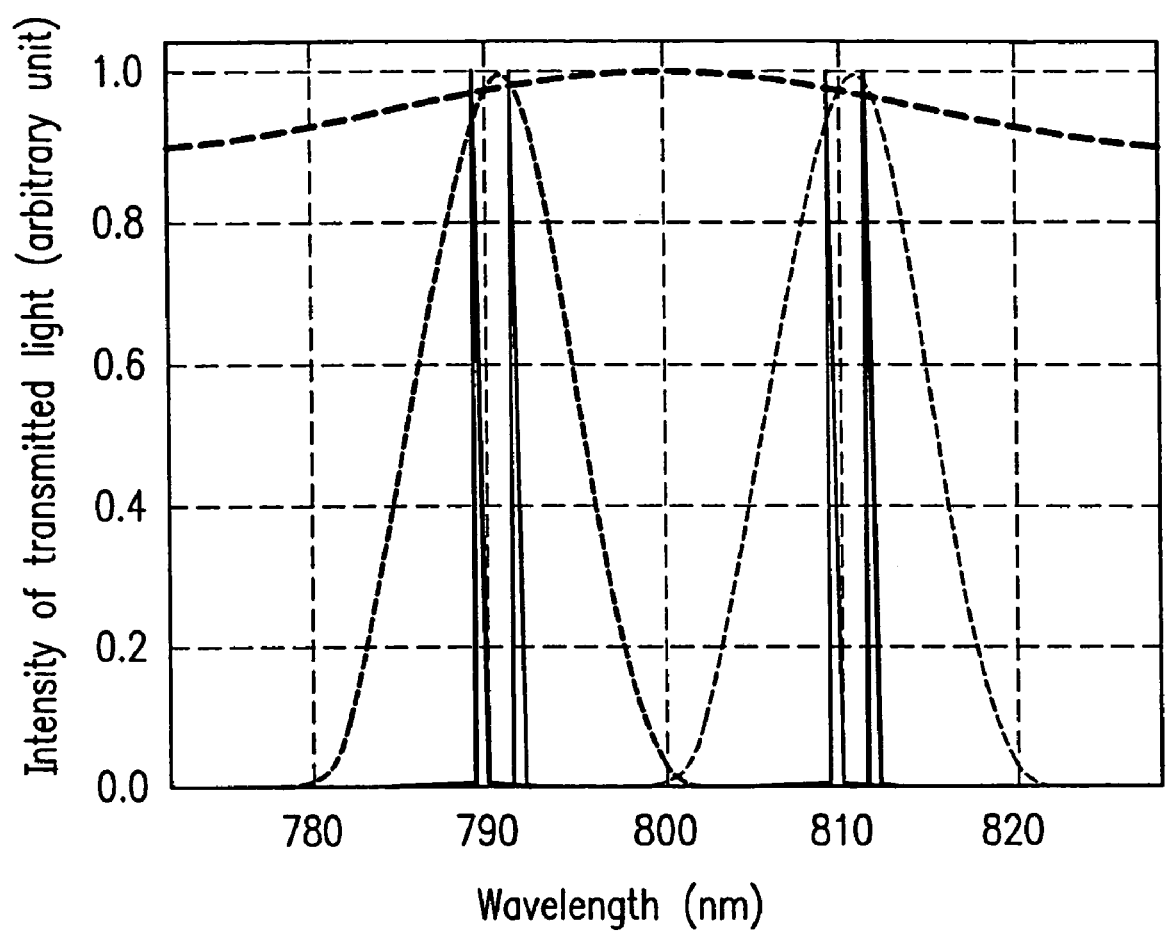
FIG. 4 is a diagram showing spectrum characteristics of beams of a multi-beam transmitter according to Example 1 of the present invention.

In any case, the light beam sources of the multi-beam transmitter 102 need to include spectrum components having a sufficient intensity different from wavelength bands used in each terminal (110 through 112). FIG. 4 shows an example of a desired spectrum of a light source of the multi-beam transmitter 102 emitting a beam corresponding to each space cell, when each terminal (110 through 112) employs the wavelength band shown in FIG. 3. In FIG. 4, a solid line indicates the case where LDs are employed as light sources of the multi-beam transmitter 102. Dashed lines indicate the case where one or a plurality of LEDs are employed as light sources of the multi-beam transmitter 102. All of the beams may be emitted from either of the LD and LED, or may be emitted from other light sources.

When the light sources of the beams 220 through 222 from the multi-beam transmitter 102 are LDs, as in each terminal, it is easy to select a wavelength band while avoiding that employed in each terminal. In down link transmission from the optical wireless hub 100, LDs have an advantage that high-speed modulation can be performed in the bandwidth of 1 GHz or more, as compared to LEDs having a modulation bandwidth of several tens of MHz.

When the light sources of the beams 220 through 222 from the multi-beam transmitter 102 are LEDs in which a spectrum of several tens of nmi has a full width at half maximum, the LDs have an advantage that for a terminal having the LD as a light source and a band-cut filter for cutting a narrow band of about 10 nm or less, a small portion of such a broad spectrum is cut off, thereby making it easy to design a system. Further, in this case, when LEDs having a plurality of peak wavelengths are provided to obtain a broad spectrum of 200 nm or more for a space cell, it is easier to cause the beams 220 through 222 to contain a sufficient intensity of spectrum component different from the spectrum components of the wavelength band that employed in each terminal (110 through 112).

As described above, in the present invention, any communication can be conducted in full-duplex, so that a procedure for communication such as request and acknowledgement and actual communication can be conducted among a plurality of terminals simultaneously. Therefore, the throughput of a LAN is significantly increased as compared with conventional LANs, and a satisfactory network, environment without a waiting time can be achieved.

As is apparent from the above description, the optical wireless hub 100 includes a wide variety of functions, such as searching and recognition of each terminal, transmission and reception of data and establishment of a link between each terminal management of links simultaneously generated, and temporary storage of data. With such an intelligent hub, when the optical transmitter-receiver of a terminal has a long range or a high speed, which will be achieved by conventional development, a plurality of terminals can have a multiple access capability without a load in each terminal. When the wavelengths used between each terminal is different from each other, full-duplex communication can be achieved in one-to-one directed communication among terminals connectable to the LAN.

As described above, with the present invention using a laser diode as a light source of a terminal transmitter, a hyper high-speed and large capacity wireless LAN for portable terminals can be constructed in which the number of channels can be increased, a transmission rate is potentially increased, and an improvement in communication ability in the terminals can be directly achieved.

EXAMPLE 2

In Example 1, an LD is employed as the light source of the transmitter of a terminal. However, the LD may have an unnecessarily large communication capacity in a small office or home having a small number of people. In such an environment, an inexpensive LED may be employed as the light source of the optical transmitter of a terminal instead of the relatively expensive LD so that the cost of the entire LAN system can be reduced at the expense of a reduction in the number of channels. Hereinafter, Example 2 of the present invention will be described with reference to the accompanying drawings. In the following description, the same figures and reference numerals as used in Example 1 are used unless otherwise indicated.

LEDs are employed as the light sources of the transmitters of the terminals 110 through 112. For this reason, which major component needs to be changed significantly from Example 1 is the band-cut filter which is provided in the receiver of a terminal so as to prevent light emitted from the transmitter of the terminal from being diffracted and returned thereto and which has a high level of reflectance selectively with respect to a wavelength close to the wavelength of the light source emitting the light.

FIG. 5 shows a spectrum characteristic of a transmitter-receiver unit of a terminal according to Example 2 of the present invention. Similar to FIG. 3, FIG. 5 shows wavelength spectra of the light sources of a terminal 1 (110), a terminal 2 (111), and a terminal 3 (112) for 3 wavelength channels, and reflectance spectra of the band-cut filters included in the receivers of the terminals 1, 2, and 3. The bandwidth to be cut off is enlarged by changing the structure of a dielectric multi-layer film in accordance with the light source of each terminal. Specifically, LEDs included in the terminals 1, 2, and 3 have wavelength bands centered at around 800 nm, 870 nm, and 950 nm, respectively, and each have a full width of about 40 nm at half maximum. The bandwidth of the filters for cutting the respective spectra is about 50 nm. Therefore, the wavelength bands of the terminals 1, 2, and 3 are spectra having a bandwidth of about 50 nm centered at around 800 nm, 870 nm, and 950 nm, respectively.

The relationship between spectra shown in FIG. 5, i.e. designation of a bandwidth to be cut off by a filter and an interval between wavelength channels, is not employed for multiple access using typical wavelength multiplexing. The relationship shown in FIG. 5 has an object to obtain full-duplex communication by reducing a signal emitted from the transmitter of a terminal and returned thereto to a level much less than that of a signal received from another transmitter, i.e., a multi-beam transmitter. It should be noted that multiplexing is conducted by space multiplexing. As described in Example 1, the number of wavelength channels means the maximum number of terminals which are simultaneously connected to a LAN according to Example 1 and which can perform one-to-one full-duplex communication between each terminal.

The number of wavelength channels should be determined based on the design of the internal structure of a transmitter-receiver of a terminal whose directional is angle and internal reflection are taken into account, the design and fabrication technique of a band-cut filter, and a communication distance and a communication rate required in SNR evaluation in which a signal emitted from a terminal and returned thereto is regarded as a noise source for the terminal. In an experimental example where substantially the same communication form as used in a conventional IrDA terminal was employed, and a peeking circuit which enables high-speed modulation was applied to an LED and a PD, the relationship shown in FIG. 5 needed to be substantially satisfied in order to achieve full-duplex communication at a communication distance of 1 m, at a communication rate of 100 Mbps, and at a one-to-one link. More preferably, the cut width of a band-cut filter is increased. In the LAN system of the present invention, a band to be modulated is preferably shifted in order not to affect communication between devices (e.g., a remote control for a TV) using an infrared ray which are located in the area but are not related to the LAN.

Further. Example 2 shows the case where the light source of a transmitter is made of AlGaAs and the detector of a receiver is a silicon pin-PD. Similar to Example 1, a system can be extended using a variety of materials.

Next, a light source of a multi-beam transmitter will be described. Similar to Example 1, preferably, each of the light sources providing the beams 220 through 222 and the like corresponding to the respective space cells basically includes one or a plurality of LEDs having a single wavelength band in view of the cost or the simplicity of the system. In this case, any one of the beams 220 through 222 and the like of the multi-beam transmitter 102 needs to include a spectrum component having a wavelength band different from that used in each terminal and a sufficient intensity. In Example 2, however, since the transmitters of the terminals employ LEDs as light sources, a wavelength band is substantially occupied by the transmitters of the terminals. In contrast with Example 1, the number of terminals used is advantageously increased when the light sources of the multi-beam transmitter 102 are LDs having a signal wavelength band. Similar to FIG. 4 illustrating Example 1, the above-described requirements can be satisfied when a very broad spectrum is achieved by combining LEDs having different peak wavelengths for each space cell. These cases are easily understood from FIGS. 3, 4, and 5. No additional figure is provided for explaining these cases.

As described above, in the present invention, any communication can be conducted in full-duplex, so that a procedure for communication, such as request and acknowledgement, and actual communication can be conducted among a plurality of terminals simultaneously. Therefore, the throughput of a LAN is significantly increased as compared with conventional LANS, and a satisfactory network environment without a waiting time can be achieved.

As is apparent from the above description, the optical wireless hub 100 includes a wide variety of functions, such as searching and recognition of each terminal, transmission and reception of data and establishment of a link between each terminal, management of links simultaneously generated, and temporary storage of data. With such an intelligent hub, when the optical transmitter-receiver of a terminal has a long range or high speed, which will be achieved by conventional development, a plurality of terminals can have a multiple access capability without a load in each terminal. When a wavelength used between each terminal is different from each other, full-duplex communication can be achieved in one-to-one directed communication among terminals connectable to the LAN.

As described above, with the present invention using a laser diode as a light source of a terminal transmitter, a hyper high-speed and large capacity wireless LAN for portable terminals can be constructed in which an improvement in communication ability in the terminals can be directly achieved. Such a LAN is relatively inexpensive and well suited for small offices or homes.

EXAMPLE 3

In addition to the situations described in Example 1 or 2, the case where terminals employing light sources (LDs or LEDs) transmitting light of the same wavelength band are located in an area will be described as Example 3.

Such a situation may emerge when a similar terminal is newly introduced to a LAN which has been previously constructed. In the LAN of the present invention, no problem arise. This is because bi-directional communication is conducted via an optical wireless hub, where light sources of a multi-beam transmitter have a wavelength band which can be received by all of the terminals, and recognition of each terminal is conducted by space division by an imaging receiver. However, terminals employing LDs or LEDs having the same wavelength band still cannot perform one-to-one directed communication with each other. Therefore, problems are avoided by using a removable band-cut filter included in the transmitter of a terminal.

Figure 6A:
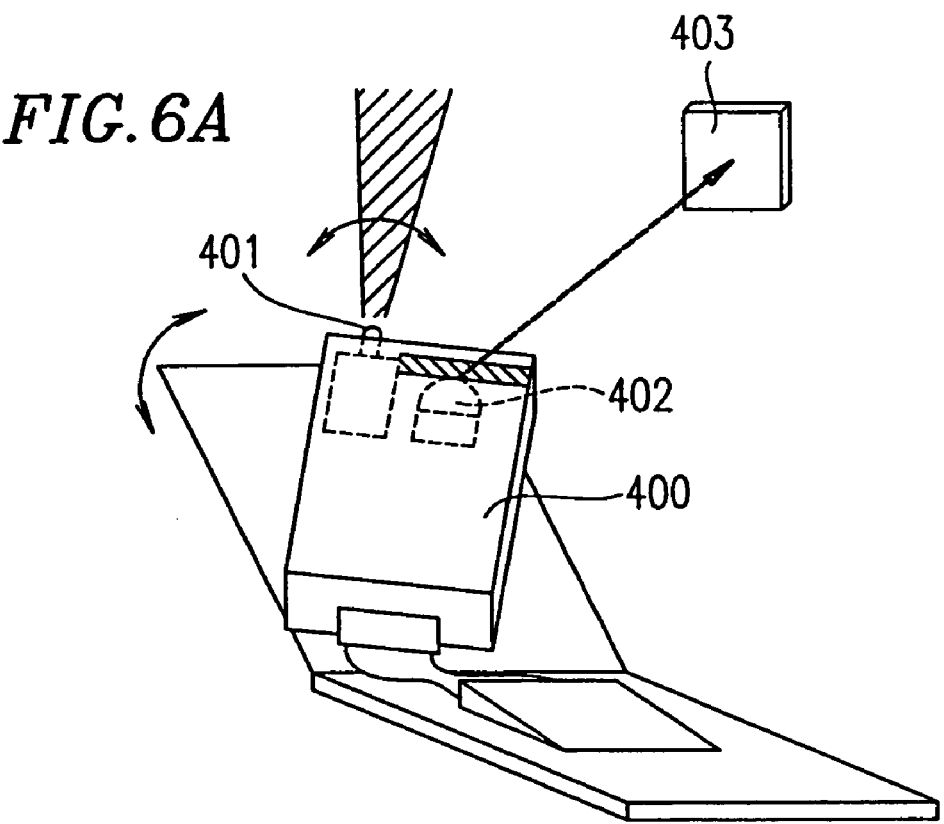
FIG. 6A is an outside diagram of a card-type terminal transmitter-receiver unit according to the present invention.
Figure 6B:
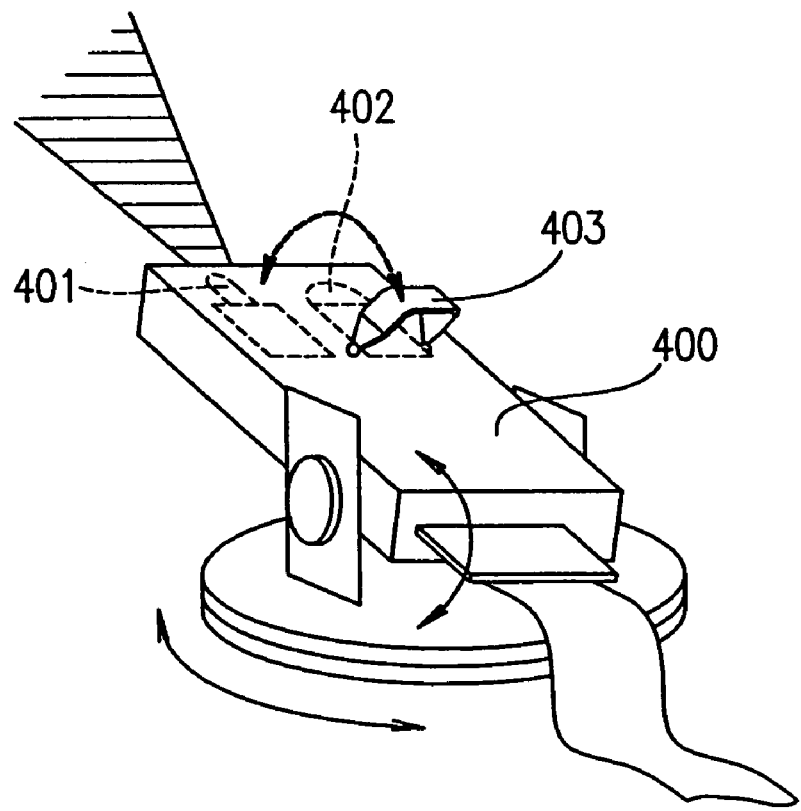
FIG. 6B is an outside diagram of a port connection-type terminal transmitter-receiver unit according to the present invention.
Figure 7:
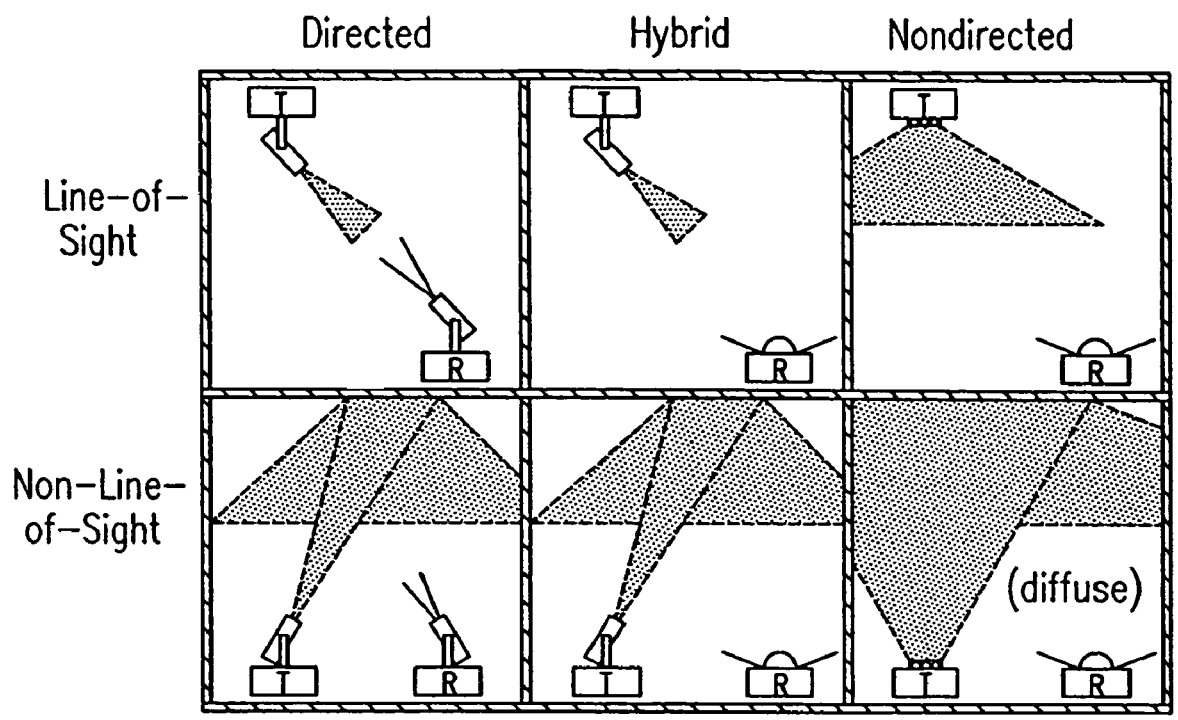
FIG. 7 is a diagram showing a variety of forms of conventional optical wireless communication.

FIG. 6A shows an example of a card-type transmitter-receiver unit 400. FIG. 6B shows an example of a port connection-type transmitter-receiver unit 400. As shown in either of FIG. 6A or 6B, the transmitter-receiver unit 400 includes a transmitter 401 and a receiver 402, and a band-cut filter 403 is provided outside the transmitter-receiver unit 400.

As to the size of transmitter-receiver unit 400, a plate shape of about 2 cm×2 cm has been realized even in a current transmitter-receiver included inside a terminal. In FIG. 6A, the previously provided band-cut filter 403 is removed from the receiver 402 adjacent the transmitter 401. Alternatively, the band-cut filter 403 may not be removed, but the angle of the band-cut filter 403 may be changed so that a detector is not shielded. The filter may be a combination of a plurality of plates, or may be in the shape of a hemisphere which surrounds a detector, as shown in FIG. 6B.

Further, as shown in FIG. 6B, preferably, the hemispherical filter may not be removed, but may be pivoted around an axis so that the filter can be removed from the PD. The reasons why a terminal can receive external signal light having the same wavelength band as that used in the terminal and communication is limited to half-duplex communication has been described with respect to the conventional techniques. A one-to-one communication form in the state where the band-out filter 403 is removed is a current communication form between IrDA terminals. Therefore, when an optical transmitter-receiver included in a terminal having the above-described removable filter and a card or port adapter is incorporated into a conventional IrDA terminal, such a terminal can be very easily connected to a wireless LAN for the hyper high-speed and large capacity line-of-sight optical communication terminal of the present invention.

When the optical transmitters of all terminals have LEDs having a wavelength band of around 850 nm (the spectrum has intensity in the wavelength range from about 800 to 1000 nm) as light sources and the receivers of all of the terminals have silicon pin-PDs, similar to a current IrDA terminal, the following configuration is provided as a most preferred example where the plurality of terminals are simultaneously connected to the LAN of the present invention. Specifically, LDs all having a wavelength band of around 780 nm are employed as light sources of the multi-beam transmitter 102. Such LDs are the most inexpensive LDs that are widely used as light sources for reading or writing data from or to existing recording media such as CDs, CD-ROMs, MOs, and MDs. An optical filter which is included in the receiver of a terminal and which selectively attenuates a signal emitted from the terminal is not necessarily the band-cut filter having a relatively narrow band as described in Example 1, or 2. An optical filter having a so-called short pass filter characteristic which has a transmittance of almost 100% with respect to a wavelength of 780 nm and a reflectance of almost 100% with respect to a longer wavelength band at least including the range from 790 to 1000 nm is sufficient.

As is apparent from the above description of Examples 1 and 3, when various types of transmitter-receivers of the terminals are combined, i.e., a plurality of terminals having light sources such as LDs or LEDs and filters of various bandwidths are provided in the same LAN, LAN connection and one-to-one directed communication can be achieved. Therefore, a very flexible LAN which allows directed/line-of-sight communication technology to be progressed can be achieved.

INDUSTRIAL APPLICABILITY

As described above, according to the space-division multiplex local area network of the present invention, the following advantages are obtained:

(1) the longer-distance directed/line-of-sight communication for use in a portable terminal allows a network environment in which simultaneous multiple access and full-duplex communication are conducted among the above-described terminals, and full-duplex communication even in one-to-one directed communication between each terminal connectable to the network is possible;

(2) the longer-range directed/line-of-sight communication for use in a portable terminal allows a network environment in which simultaneous multiple access and full-duplex communication are conducted among the is above-described terminals;

(3) the longer-range directed/line-of-sight communication for use in a portable terminal allows a network environment in which simultaneous multiple access and full-duplex communication are conducted among the above-described terminals, so that the problem with wavelength band in directed communication between each terminal can be avoided;

(4) the optical transmitter-receiver allows a terminal having a conventional optical communication function to be connected to the above-described hyper high-speed and large capacity wireless LAN for portable terminals; and (5) terminals having various types of transmitter-receiver exist in the same LAN, whereby a very flexible LAN which allows directed/line-of-sight communication technology to be progressed, i.e. high-speed and a long distance, can be achieved.

The invention claimed is:

1. A base station for use in a space-division multiplex optical wireless local area network for simultaneously interconnecting more than one of a plurality of terminals associated with the wireless local area network to at least one other terminal associated with the wireless local area network, the base station comprising:
    an angle diversity receiver; and
    a multi-beam transmitter for outputting a plurality of beams carrying output information from said angle diversity receiver,
    wherein the multi-beam transmitter includes a plurality of optical transmitters so as to form a plurality of different space cells each having a predetermined size respectively associated with corresponding ones of said beams, and each of the plurality of optical transmitters includes at least one LD or at least one LED as a light source;
    wherein said angle-diversity receiver includes a plurality of receiving elements separately associated with each respective one of said different space cells, and at least one of the plurality of receiving elements is positioned to receive input from each of said more than one of a plurality of terminals associated with the wireless local area network and
    wherein, in the multi-beam transmitter, directional half value angles $\phi$ of each light source of each of the plurality of optical transmitters are set to specific angles different from each other, the directional half angles being represented by $\phi = C \times \theta$ where C is a constant in the range from 0.70 to 1.00, and $\theta$ is an angle of each of the plurality of space cells each having a predetermined size.

2. A base station according to claim 1, wherein the angle-diversity receiver includes a lens system dedicated to reception having a spatial resolution higher than a spatial resolution of the plurality of space cells each having a predetermined size.

3. A base station according to claim 2, wherein a radius of a space cell provided by each of the plurality of optical transmitters is in a range from 20 cm to 100 cm at a predetermined maximum possible distance for communication.

4. A base station according to claim 1, wherein a radius of a space cell provided by each of the plurality of optical transmitters is in a range from 20 cm to 100 cm at a predetermined maximum possible distance for communication.

5. A base station according to claim 1, wherein the angle-diversity receiver includes a lens system dedicated to reception having a spatial resolution higher than a spatial resolution of the plurality of space cells each having a predetermined size.

6. A base station according to claim 1, wherein a radius of a space cell provided by each of the plurality of optical transmitters is in a range from 20 cm to 100 cm at a predetermined maximum possible distance for communication.

7. A space-division multiplex optical wireless local area network for simultaneously interconnecting more than one of a plurality of terminals associated with the wireless local area network to at least one other terminal associated with the wireless local area network via a base station, the local area network comprising:
   an angle-diversity receiver; and
   a multi-beam transmitter for outputting a plurality of beams carrying output information from said angle diversity receiver,
   wherein the multi-beam transmitter includes a plurality of optical transmitters so as to form a plurality of different space cells each having a predetermined size respectively associated with corresponding ones of said beams, and each of the plurality of optical transmitters includes at least one LD or at least one LED as a light source;
   wherein said angle-diversity receiver includes a plurality of receiving elements separately associated with each respective one of said different space cells, and at least one of the plurality of receiving elements is positioned to receive input from each of said more than one of a plurality of terminals associated with the wireless local area network and
   wherein, in the multi-beam transmitter, directional half value angles φ of each light source of each of the plurality of optical transmitters are set to specific angles different from each other, the directional half angles being represented by $\phi D = C \times \theta$ where C is a constant in the range from 0.70 to 1.00, and θ is an angle of each of the plurality of space cells each having a predetermined size.

8. A space-division multiplex optical wireless local area network according to claim 7, wherein each of the plurality of terminals includes an optical transmitter having at least one light source, the angle-diversity receiver has an optical filter for selectively attenuating light transmitted from the transmitter of the terminal, and means for easily removing the optical filter are provided.

9. A space-division multiplex optical wireless local area network according to claim 8, wherein each of the plurality of beams output from the multi-beam transmitter of the base station includes a spectrum component having a sufficient intensity different from the spectrum components of any one of wavelength bands used by each of the plurality of terminals.

10. A space-division multiplex optical wireless local area network according to claim 8, wherein each of the plurality of beams output from the multi-beam transmitter of the base station includes at least one wavelength band used by the plurality of terminals and a spectrum component having a sufficient intensity other than the at least one wavelength band.

* * * * *